Patented Mar. 30, 1948

2,438,789

UNITED STATES PATENT OFFICE 2,438,789

PRODUCTION OF ORGANIC ACIDS

Irwin A. Pearl, Appleton, Wis., assignor, by mesne assignments, to Sulphite Products Corporation, a corporation of Wisconsin No Drawing. Application April 19, 1946, Serial No. 663,633

2 Claims. (Cl. 260—521)

The present invention relates to the production of organic acids from the corresponding aldehydes and is of particular advantage in connection with aldehydes that are either resistant to the usual oxidizing agents, or tend to form other products than the derived acid or additional products besides the derived acid.

An example according to the invention is as follows:

295 parts of finely powdered gold oxide is covered with about 2500 parts of water and with vigorous agitation is treated successively with about 400 parts of solid sodium hydroxide and about 290 parts of vanillin. The warm reaction mixture is heated to boiling for about twenty minutes and then filtered. Pure gold is obtained as the precipitate. Upon acidification, as with sulfur dioxide, the vanillic acid separates and may be filtered and washed with a little cold water. About 300 parts of vanillic acid melting at 210–211° C. is obtained.

The gold precipitate is in very finely divided state such that its usefulness as a catalyst is indicated. The recovery of gold is a full 100% and the metal can easily be reconverted to the oxide and thus used to repeat the process indefinitely.

The reaction may conveniently be expressed by the following equation:

$$3RCHO + Au_2O_3 \rightarrow 3RCOOH + 2Au$$

where RCHO is an organic aldehyde. The aldehydes in connection with which the reaction appears to be most convenient and useful are principally the aromatic aldehydes such as benzaldehyde, vanillin, syringaldehyde and ortho-vanillin.

Without further elaboration, the foregoing will so fully explain my invention that others may readily adapt the same for use under varying conditions of service. As at present advised, with respect to the apparent scope of my invention, I desire to claim the subject-matter of the following claims, and equivalents thereof.

I claim:

1. In the process of effecting substantially quantitative transformation of vanillin to vanillic acid: the step of reacting three moles of vanillin in hot aqueous alkaline solution with one mole of gold sesquioxide in the presence of alkali to produce three moles of the alkali salt of vanillic acid.

2. In the process of producing the derived mono-carboxylic acids from aldehydes selected from the group consisting of vanillin, ortho-vanillin and syringaldehyde, the improvement which consists in reacting the aldehyde with gold oxide in a hot aqueous solution of alkali metal hydroxide.

IRWIN A. PEARL.

REFERENCES CITED

The following references are of record in the file of this patent:

UNITED STATES PATENTS

| Number | Name | Date |
|---|---|---|
| 1,998,878 | Lefort | Apr. 23, 1935 |
| 2,165,428 | Waugh | July 11, 1939 |
| 2,293,104 | Bludworth | Aug. 18, 1942 |
| 2,367,501 | Hull et al. | Jan. 16, 1945 |

OTHER REFERENCES

Keiff: J. Am. Chem. Soc., 48, 2893–2899 (1926).

Berkman et al.: Catalysis, page 804, Reinhold Pub. Co., New York, 1940. (Copy in Scientific Library.)